(12) United States Patent
Lin

(10) Patent No.: US 8,942,142 B2
(45) Date of Patent: Jan. 27, 2015

(54) METHOD AND APPARATUS FOR IMPROVING ACK/NACK BUNDLING

(75) Inventor: Ko-Chiang Lin, Taipei (TW)

(73) Assignee: Innovative Sonic Limited, Ebene (MU)

( * ) Notice: Subject to any disclaimer, the term of this patent is extended or adjusted under 35 U.S.C. 154(b) by 831 days.

(21) Appl. No.: 12/646,988

(22) Filed: Dec. 24, 2009

(65) Prior Publication Data

US 2010/0165939 A1  Jul. 1, 2010

Related U.S. Application Data

(60) Provisional application No. 61/141,248, filed on Dec. 30, 2008.

(51) Int. Cl.
| | | |
|---|---|---|
| *H04J 3/00* | (2006.01) | |
| *H04W 4/00* | (2009.01) | |
| *H04W 72/04* | (2009.01) | |
| *H04W 72/12* | (2009.01) | |
| *H04L 1/18* | (2006.01) | |
| *H04L 5/00* | (2006.01) | |

(52) U.S. Cl.
CPC ............ *H04L 5/0053* (2013.01); *H04L 1/1854* (2013.01)
USPC ........... 370/280; 370/329; 370/336; 370/345; 455/422.1; 455/450; 455/517; 714/749; 714/776

(58) Field of Classification Search
CPC .................................................. H04L 5/0055
USPC ............... 370/280, 329, 336, 345; 455/422.1, 455/450, 517; 714/749, 776
See application file for complete search history.

(56) References Cited

U.S. PATENT DOCUMENTS

| | | | | |
|---|---|---|---|---|
| 7,774,686 | B2 * | 8/2010 | Ahn et al. ...................... | 714/776 |
| 8,108,757 | B2 * | 1/2012 | Ahn et al. ...................... | 714/776 |
| 2007/0245201 | A1 * | 10/2007 | Sammour et al. ............. | 714/748 |
| 2008/0137562 | A1 * | 6/2008 | Li et al. ......................... | 370/280 |
| 2009/0129317 | A1 * | 5/2009 | Che et al. ....................... | 370/328 |
| 2009/0168731 | A1 * | 7/2009 | Zhang et al. ................... | 370/336 |
| 2009/0241004 | A1 * | 9/2009 | Ahn et al. ...................... | 714/749 |
| 2009/0249153 | A1 * | 10/2009 | Zhang ............................ | 714/748 |
| 2009/0323617 | A1 * | 12/2009 | Che et al. ....................... | 370/329 |
| 2010/0034158 | A1 * | 2/2010 | Meylan .......................... | 370/329 |
| 2010/0042884 | A1 * | 2/2010 | Kuo et al. ...................... | 714/748 |
| 2010/0042888 | A1 * | 2/2010 | Kuo .............................. | 714/749 |
| 2010/0111068 | A1 * | 5/2010 | Wu ................................ | 370/345 |

(Continued)

OTHER PUBLICATIONS

Texas Instruments, ACK/NAK DTX Detection with ACK/NAK Bundling in TDD, Agenda Item 7.1.2 , May 5-May 9, 2008, pp. 1-7, 3GPP TSG RAN WG1#53, R1-081985, XP002549274, Kansas City, MO,USA.

(Continued)

*Primary Examiner* — Alpus H Hsu
(74) *Attorney, Agent, or Firm* — Blue Capital Law Firm, P.C.

(57) ABSTRACT

A method for improving ACK/NACK bundling in a user equipment (UE) of a wireless communication system is disclosed. The method includes steps of receiving an uplink grant allocated to an uplink sub-frame, the sub-frame being utilized for transmitting an HARQ feedback corresponding to a plurality of downlink sub-frame, a TDD UL/DL configuration of the UE being set to 0; and determining whether the UE misses any downlink assignment is missing according to a downlink assignment index (DAI) carried in a latest received Physical Downlink Control Channel (PDCCH) for downlink assignment.

16 Claims, 6 Drawing Sheets

(56) References Cited

U.S. PATENT DOCUMENTS

| | | | |
|---|---|---|---|
| 2010/0111069 A1* | 5/2010 | Torsner et al. | 370/350 |
| 2010/0115367 A1* | 5/2010 | Hsu | 714/748 |
| 2010/0142494 A1* | 6/2010 | Hsu | 370/336 |
| 2010/0150081 A1* | 6/2010 | Gao et al. | 370/329 |
| 2010/0177676 A1* | 7/2010 | Wang et al. | 370/312 |
| 2010/0208629 A1* | 8/2010 | Ahn et al. | 370/280 |
| 2010/0210256 A1* | 8/2010 | Shen et al. | 455/422.1 |
| 2010/0281326 A1* | 11/2010 | Ahn et al. | 714/749 |
| 2010/0329194 A1* | 12/2010 | Shen et al. | 370/329 |
| 2010/0332937 A1* | 12/2010 | Dai et al. | 714/749 |
| 2011/0002309 A1* | 1/2011 | Park et al. | 370/335 |
| 2011/0044278 A1* | 2/2011 | Astely et al. | 370/329 |
| 2011/0051657 A1* | 3/2011 | Li et al. | 370/328 |
| 2011/0096693 A1* | 4/2011 | Astely et al. | 370/252 |
| 2011/0141952 A1* | 6/2011 | Wang et al. | 370/294 |
| 2011/0142075 A1* | 6/2011 | Che et al. | 370/476 |
| 2011/0176443 A1* | 7/2011 | Astely et al. | 370/252 |
| 2011/0268032 A1* | 11/2011 | Kim et al. | 370/328 |
| 2011/0268053 A1* | 11/2011 | Che et al. | 370/329 |
| 2012/0113925 A1* | 5/2012 | Ahn et al. | 370/329 |
| 2012/0294207 A1* | 11/2012 | Ahn et al. | 370/280 |
| 2013/0194983 A1* | 8/2013 | Ahn et al. | 370/280 |
| 2014/0016522 A1* | 1/2014 | Ahn et al. | 370/280 |

OTHER PUBLICATIONS

Huawei, Consideration on ACK/NACK bundling and Multi-ACK/NACK multiplexing in TDD, Agenda Item 7.1.2, pp. 1-5, May 5-9, 2008, 3GPP TSG-RAN-WG1 Meeting #53, R1-081790, XP-002549272, Kansas City, MO, USA.

3GPP, TS 36.213 V8.5.0 Draft 3GPP TS 36.213 V8.5.0 (Dec. 2008), "Evolved Universal Terrestrial Radio Access (E-UTRA); Physical layer procedures", Dec. 2008.

3GPP TSG-RAN1 Meeting #55, Prague, Czech Republic; Nov. 10-14, 2008 (R1-084363).

Office Action on corresponding foreign application (JP2009-277029) from JPO dated Jan. 17, 2012.

* cited by examiner

METHOD AND APPARATUS FOR IMPROVING ACK/NACK BUNDLING

CROSS REFERENCE TO RELATED APPLICATIONS

This application claims the benefit of U.S. Provisional Application No. 61/141,248, filed on Dec. 30, 2008 and entitled "Method and Apparatus for Improving ACK/NACK Bundling in a Wireless Communication System", the contents of which are incorporated herein by reference.

BACKGROUND OF THE INVENTION

1. Field of the Invention

The present invention relates to a method and apparatus for improving acknowledgement/negative-acknowledgement (ACK/NACK) bundling, and more particularly, to a method and apparatus for improving ACK/NACK bundling in a user equipment (UE) of a wireless communication system to correctly determine whether any PDCCH downlink assignment is missing, such that ACK or NACK can be transmitted.

2. Description of the Prior Art

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

The LTE system supports Frequency Division Duplex (FDD) mode and Time Division Duplex (TDD) mode. The frame structure in the FDD mode is different from that in the TDD mode. In the FDD mode, a 10 ms long radio frame is divided into 10 sub-frames. Each sub-frame includes two slots, and each slot is 0.5 ms long. In the TDD mode, the 10 ms radio frame has two half-frames, each 5 ms long. Each half-frame includes four normal sub-frames and one special sub-frame, each 1 ms long. The special sub-frame includes three special slots: Downlink Pilot Time Slot (DwPTS), Guard Period (GP) and Uplink Pilot Time Slot (UpPTS). The DwPTS is used for transmitting downlink control signals, the UpPTS is used for transmitting uplink control signals, and the GP is a guard period between the DwPTS and the UpPTS. A total length of the three special slots is 1 ms long, and each length can be configured according to practical requirement of the network.

Compared to the FDD mode, the TDD mode supports different time allocation for uplink and downlink. That is, a ratio of uplink transmission time and downlink transmission time may not be 1:1. The allocation for uplink and downlink sub-frames can be adjusted according to transmission service types, so as to meet asymmetric uplink/downlink transmission requirement. For example, according to current specifications, six allocation ratios for uplink and downlink sub-frames are defined in the TDD mode, and are controlled by TDD UL/DL configurations 0-6 indicated by a higher layer. As for related definition of the TDD UL/DL configurations and the corresponding allocation ratios for uplink and downlink sub-frames, please refer to related specifications, which are not narrated herein.

For different TDD UL/DL configurations, the number of sub-frames for uplink transmission and downlink transmission are different. If the downlink sub-frames are more than the uplink sub-frames, feedbacks of multiple downlink transmissions can only be performed in one uplink sub-frame. In other words, a UE needs to transmit multiple ACK/NACKs corresponding to downlink packets being received in one uplink sub-frame, so as to support Hybrid Automatic Repeat reQuest (HARQ) operation. In this case, in order to reduce an amount of bits transmitted by the uplink sub-frame, a technique of ACK/NACK bundling is introduced in the prior art, which utilizes one ACK/NACK signal to complete HARQ feedbacks of multiple downlink packets being received, so as to solve the problem resulted from asymmetric uplink/downlink transmission. Please note that, in the following description, the uplink sub-frame for ACK/NACK transmission is called a common sub-frame, while a set of downlink sub-frames corresponding to the common sub-frame are called bundled sub-frames.

Generally, ACK/NACK bundling generates the HARQ feedback in the common uplink sub-frame by performing a logical AND operation for the ACK/NACK bits of the downlink packets received within the bundled sub-frames. For example, if all the HARQ feedbacks of the downlink packets received within the bundled sub-frames are ACKs, the UE would transmit an ACK in the common uplink sub-frame, so as to acknowledge reception of all the received packets. On the contrary, if any HARQ feedback of the downlink packets received within the bundled sub-frames is a NACK, the UE would generate a NACK in the common uplink sub-frame to request retransmission of all the received packets.

Besides, for each uplink sub-frame or downlink sub-frame, the UE shall monitor a Physical Downlink Control Channel (PDCCH) to detect whether there is any uplink grant or downlink assignment dynamically scheduled by the network, so as to perform a Physical Uplink Shared Channel (PUSCH) transmission in a corresponding uplink sub-frame or receive a Physical Downlink Shared Channel (PDSCH) transmission in a corresponding downlink sub-frame accordingly. Therefore, if a downlink assignment dynamically scheduled by the network is missed, since the UE does not know there is a downlink packet needed to be received in a corresponding downlink sub-frame, the UE would not generate a corresponding HARQ feedback as well. In this case, since the HARQ feedback transmitted in the common sub-frame are generated according to the HARQ feedbacks of the received packets, the network cannot know the UE fails to receive the downlink packet due to missing the downlink assignment. Therefore, the network would not perform any packet retransmission, causing the downlink packet is lost by the physical layer.

In order to avoid packet loss due to a downlink assignment miss, the prior art adds a 2 bit Downlink Assignment Index (DAI) field in a PDCCH signaling. The DAI denotes a number of downlink assignments the UE shall receive, such that the UE can correctly transmit ACK or NACK by the ACK/NACK bundling.

For different PDCCH formats, the DAI field has different meanings. For a PDCCH with Downlink Control Information (DCI) format 0, e.g. a PDCCH carrying an uplink grant allocated to the common sub-frame, the DAI field denotes a total number of downlink sub-frames with PDSCH transmissions within the bundled sub-frames, and is denoted by a parameter V_UL_DAI in the UE. In other words, the value of the parameter V_UL_DAI includes dynamic scheduled PDSCH transmissions (i.e. PDSCH transmission with corresponding PDCCH) and pre-defined PDSCH transmissions (i.e. PDSCH transmission without corresponding PDCCH), such as Semi-Persistent Scheduling (SPS) transmission.

For a PDCCH with DCI format 1, 1A, 1B, 1D, 2 and 2A, e.g. a PDCCH carrying a downlink assignment allocated to the bundled sub-frames, the DAI field denotes an accumulative number of PDSCH transmissions with corresponding PDCCH up to a current downlink sub-frame within the bundled sub-frames, and is denoted by a parameter V_DL_DAI in the UE.

In addition, the UE maintains a parameter U_DAI and a parameter N_SPS. The parameter U_DAI records a number of dynamic scheduled PDSCH transmissions up to the current downlink sub-frame within the bundled sub-frames. The parameter N_SPS records a number of pre-defined PDSCH transmissions up to the current downlink sub-frame within the bundled sub-frames.

Therefore, whenever the UE detects a PDCCH signaling, the UE can determine whether any downlink assignment is missing by comparing the DAI carried by the PDCCH signaling with the parameters U_DAI and N_SPS maintained by the UE itself. Besides, when the UE performs uplink transmission in the common sub-frame, the UE can further determine a number of downlink sub-frames that generate HARQ feedbacks within the bundled downlink sub-frames, which is denoted by a parameter N_bundled.

Please note that the DAI field carried by PDCCH only has two bits. Therefore, in the current specifications, the parameter V_UL_DAI and V_DL_DAI are represented by values of 1-4. However, since the number of downlink sub-frames within the bundled sub-frames may be 0-9, a modulo operation is performed to correlate the parameter V_UL_DAI and V_DL_DAI with the number of downlink sub-frames. For example, the value "1" represents 1, 5 or 9 downlink sub-frames, the value "2" represents 2 or 6 downlink sub-frames, the value "3" represents 3 or 7 downlink sub-frames, and the value "4" represents 0, 4 or 8 downlink sub-frames.

According to the current specifications, for the case that the UE does not perform uplink transmission in the common sub-frame, since the UE does not receive any uplink grant allocated to the common sub-frame, the UE can only rely on the DAI carried in the received PDCCH signaling for downlink assignment (i.e. V_DL_DAI) to determine whether any downlink assignment is missing. If the parameter V_DL_DAI does not conform to the parameter U_DAI, i.e. $V_{DAI}^{DL} \neq (U_{DAI}-1) \bmod 4+1$, the UE determines that at least one downlink assignment is missing.

For the case that the UE performs uplink transmission in the common sub-frame and the uplink transmission is adjusted according to a PDCCH with DCI format 0 (i.e. the UE has received an uplink grant allocated to the common sub-frame by the network), the UE can determine whether any downlink assignment is missing according to the DAI carried in the received PDCCH signaling for uplink grant (i.e. V_UL_DAI). If the parameter V_UL_DAI does not conform to a sum of the parameter U_DAI and the parameter N_SPS, i.e. $V_{DAI}^{UL} \neq (U_{DAI}+N_{SPS}-1) \bmod 4+1$, then the UE determines that at least one downlink assignment is missing and generates a NACK in the common sub-frame. Besides, the UE sets the number of downlink sub-frames that generate the HARQ feedbacks within the bundled sub-frames (i.e. the parameter N_bundled) as the value of the parameter V_UL_DAI. If the sum of the parameter U_DAI and the parameter N_SPS is 0 and the parameter V_UL_DAI is 4, i.e. there is no PDSCH transmission within the bundled sub-frames, then the UE shall not transmit any ACK or NACK.

For the case that the UE performs uplink transmission in the common sub-frame and the uplink transmission is not adjusted according to a PDCCH with DCI format 0, i.e. the UE performs the PUSCH transmission according to a pre-defined uplink grant, the UE can only determine whether any downlink assignment is missing according to the DAI carried in the received PDCCH signaling for downlink assignment (i.e. V_DL_DAI). If the parameter V_DL_DAI does not conform to the parameter U_DAI, i.e. $V_{DAI}^{DL} \neq (U_{DAI}-1) \bmod 4+1$, the UE determines least one downlink assignment is missing, and the UE shall generate a NACK in the common sub-frame. Besides, the UE sets the number of downlink sub-frames that generate the HARQ feedbacks within the bundled sub-frames (i.e. N_bundled) as the sum of the parameter U_DAI and the parameter N_SPS. If the sum of the parameter U_DAI and the parameter N_SPS is 0, i.e. there is no PDSCH transmission within the bundled sub-frames, then the UE shall not transmit any ACK or NACK.

However, according to the current specifications, for TDD UL/DL configuration 0, the PDCCH with DCI format 0 (i.e. the PDCCH carrying an uplink grant) does not have a DAI field. Therefore, for a scenario that TDD UL/DL configuration is 0 and the PDCCH with DCI format 0 is received, the UE can neither determine whether any downlink assignment is missing nor determine whether to transmit ACK/NACK in the common sub-frame. In addition, the UE cannot correctly set the number of downlink sub-frames that generate the HARQ feedbacks within the bundled sub-frames (i.e. N_bundled) as well.

SUMMARY OF THE INVENTION

It is therefore an objective of the present invention to provide a method and apparatus for improving ACK/NACK bundling.

The present invention discloses a method for improving ACK/NACK bundling in a user equipment (UE) of a wireless communication system. The method includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames, a time division duplex (TDD) UL/DL configuration of the UE being set to 0; and determining whether the UE misses any downlink assignment according to a downlink assignment index (DAI) carried in a latest received Physical Downlink Control Channel (PDCCH) signaling for downlink assignment.

The present invention further discloses a communication device for improving acknowledgement/negative-acknowledgement (ACK/NACK) bundling in a user equipment (UE) of a wireless communication system. The communication device includes a processor, which is utilized for executing a program; and a storage device, which is coupled to the processor, and is utilized for storing the program. The program includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames, a time division duplex (TDD) UL/DL configuration of the UE being set to 0; and determining whether the UE misses any downlink assignment according to a downlink assignment index (DAI) carried in a latest received PDCCH signaling for downlink assignment.

The present invention discloses a method for improving acknowledgement/negative-acknowledgement (ACK/NACK) bundling in a user equipment (UE) of a wireless communication system. The method includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames, a time division duplex (TDD) UL/DL configuration of the UE being set to 0; and determining a number of downlink sub-frames generating the HARQ feedback within the plurality of downlink sub-frames according to a number of PDSCH transmissions detected by the UE within the plurality of downlink sub-frames.

The present invention further discloses a communication device for improving acknowledgement/negative-acknowledgement (ACK/NACK) bundling in a user equipment (UE) of a wireless communication system. The communication device includes a processor, which is utilized for executing a program; and a storage device, which is coupled to the processor, and is utilized for storing the program. The program includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames, a time division duplex (TDD) UL/DL configuration of the UE being set to 0; and determining a number of downlink sub-frames generating the HARQ feedback within the plurality of downlink sub-frames according to a number of PDSCH transmissions detected by the UE within the plurality of downlink sub-frames.

The present invention discloses a method for improving acknowledgement/negative-acknowledgement (ACK/NACK) bundling in a user equipment (UE) of a wireless communication system. The method includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames; determining whether a PDCCH carrying the uplink grant has a downlink assignment index (DAI); and determining whether the UE misses any downlink assignment and a number of downlink sub-frames generating the HARQ feedback within the plurality of downlink sub-frames according to the DAI.

The present invention further discloses a communication device for improving acknowledgement/negative-acknowledgement (ACK/NACK) bundling in a user equipment (UE) of a wireless communication system. The communication device includes a processor, which is utilized for executing a program; and a storage device, which is coupled to the processor, and is utilized for storing the program. The program includes receiving an uplink (UL) grant allocated to an uplink sub-frame, the uplink sub-frame being utilized for transmitting a hybrid automatic repeat request (HARQ) feedback corresponding to a plurality of downlink (DL) sub-frames; determining whether a PDCCH carrying the uplink grant has a downlink assignment index (DAI); and determining whether the UE misses any downlink assignment and a number of downlink sub-frames generating the HARQ feedback within the plurality of downlink sub-frames according to the DAI.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
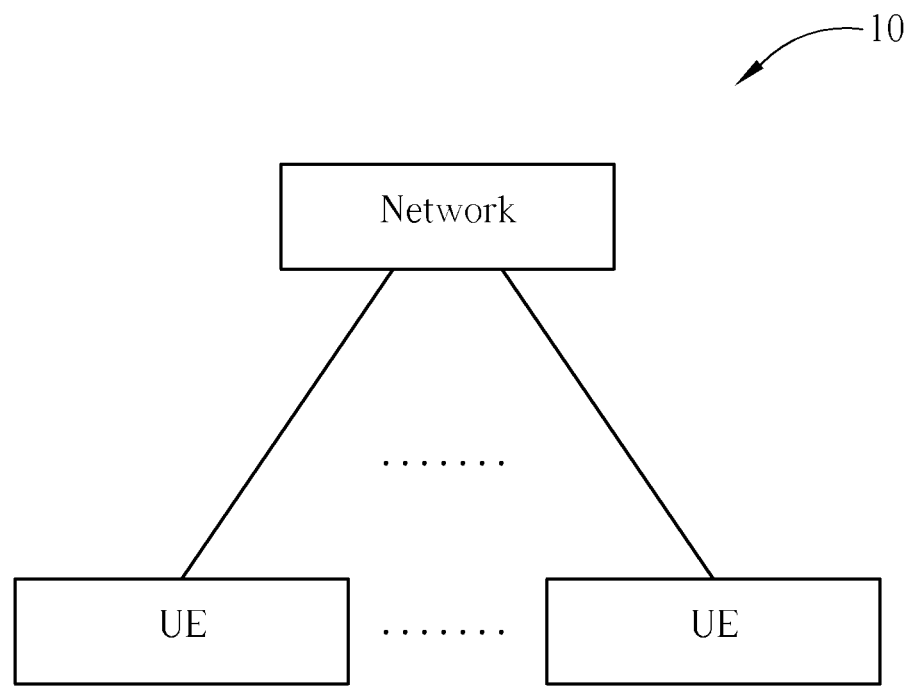
FIG. 1 is a schematic diagram of a wireless communications system.

Please refer to FIG. 1, which is a schematic diagram of a wireless communication system 10. The wireless communications system 10 is preferred to be a Long Term Evolution (LTE) communications system, and is briefly formed with a network terminal and a plurality of user equipments (UEs). In FIG. 1, the network terminal and the UEs are simply utilized for illustrating the structure of the wireless communications system 10. Practically, the network terminal may include a plurality of evolved base stations (eNBs), an evolved UMTS radio access network (EUTRAN) and so on according to actual demands, and the UEs can be apparatuses such as mobile phones, computer systems, etc.

Figure 2:
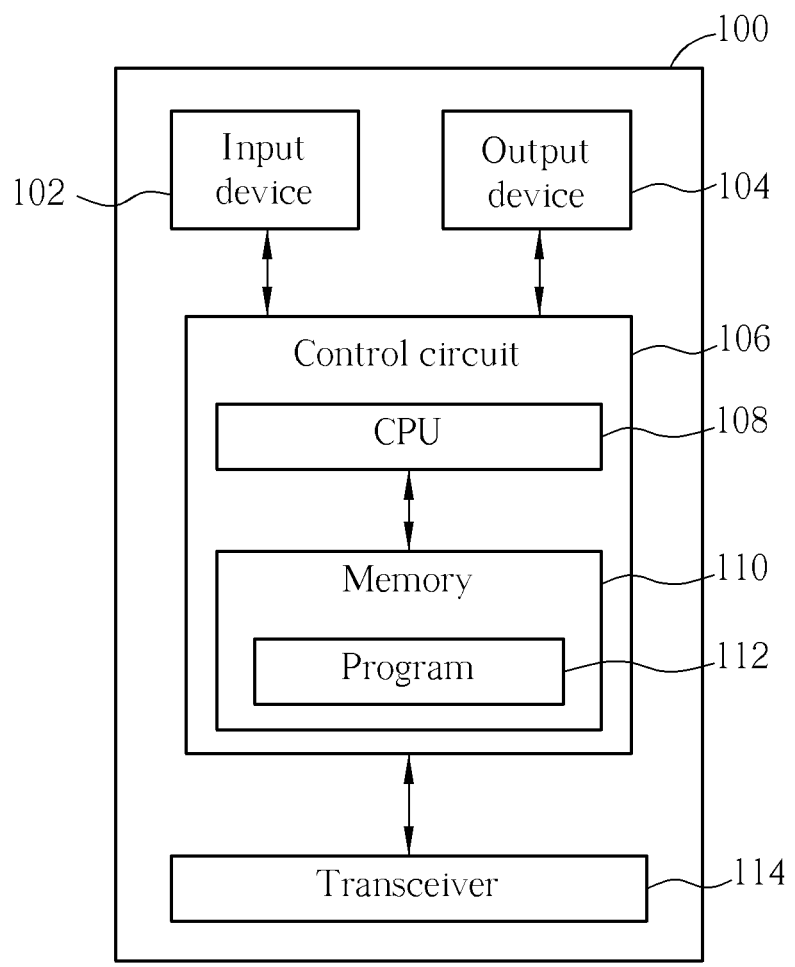
FIG. 2 is a functional block diagram of a wireless communications device.

Please refer to FIG. 2, which is a functional block diagram of a wireless communications device 100. The communications device 100 can be utilized for realizing the UEs in FIG. 1. For the sake of brevity, FIG. 2 only shows an input device 102, an output device 104, a control circuit 106, a central processing unit (CPU) 108, a memory 110, a program 112, and a transceiver 114 of the wireless communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
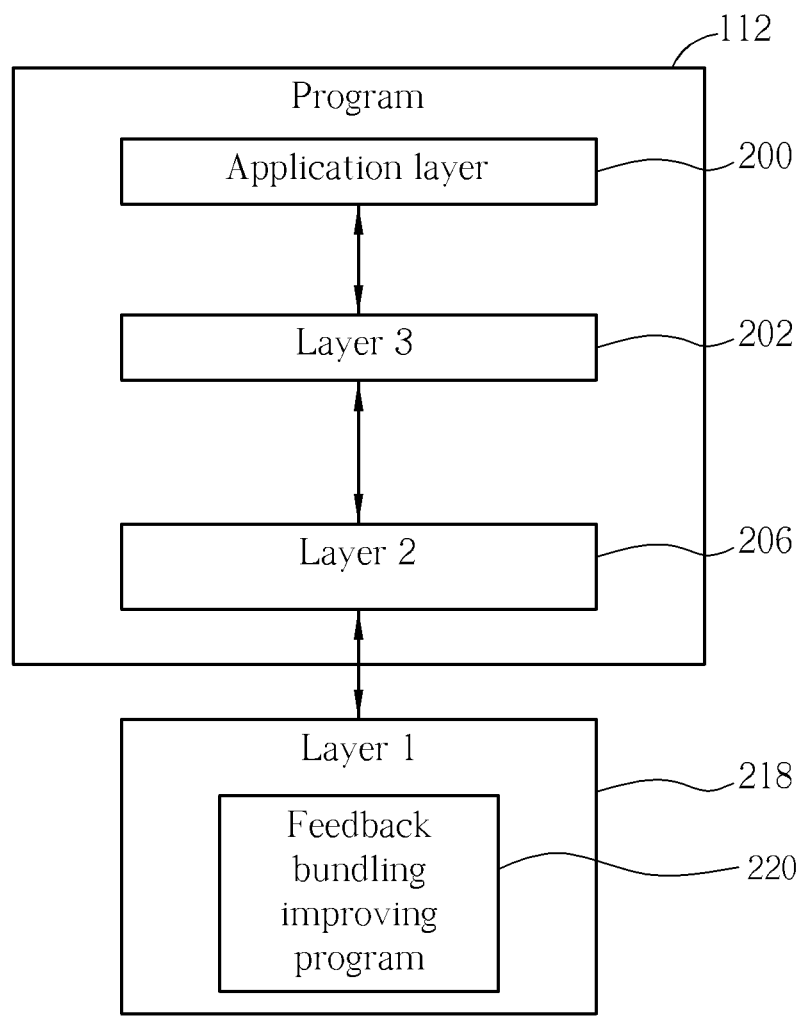
FIG. 3 is a schematic diagram of a program shown in FIG. 2.

Please continue to refer to FIG. 3, which is a schematic diagram of the program 112 shown in FIG. 2. The program 112 includes an application layer 200, a Layer 3 202, and a Layer 2 206, and is coupled to a Layer 1 218. The Layer 3 202 includes a Radio Resource Control (RRC) entity, and is utilized for realizing resource control. The Layer 2 206 includes a Radio Link Control (RLC) entity and a Medium Access Control (MAC) entity, and is utilized for realizing link control. The Layer 1 218 is utilized for realizing physical link.

In LTE system, a technique of ACK/NACK bundling is introduced in a TDD mode. ACK/NACK bundling utilizes one ACK/NACK to complete HARQ feedbacks of multiple downlink packets, so as to solve problems resulted from asymmetric uplink/downlink transmission. Besides, in order to avoid packet loss due to missing a downlink assignment, a 2 bit Downlink Assignment Index (DAI) field is added into PDCCH signaling, for indicating a number of downlink assignments the UE shall receive, such that the UE can correctly transmit ACK or NACK by the ACK/NACK bundling.

However, for TDD UL/DL configuration 0, a PDCCH with Downlink Control Information (DCI) format 0 (i.e. the PDCCH carrying an uplink grant) does not have a DAI field. Therefore, for a scenario that TDD UL/DL configuration is 0 and the PDCCH with DCI format 0 is received, the UE can neither determine whether any downlink assignment is missing nor determine whether to transmit ACK or NACK in a common sub-frame.

Figure 4:
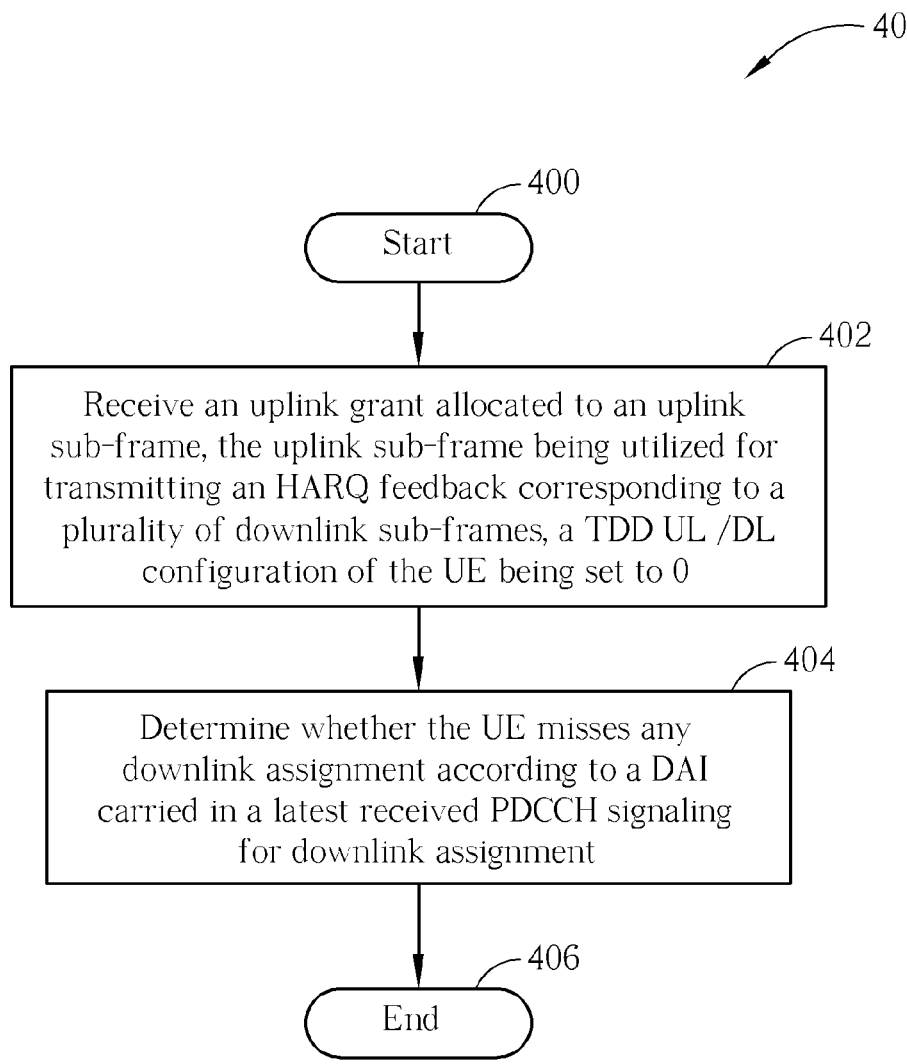
FIG. 4 to FIG. 6 is a schematic diagram of a process according to an embodiment of the present invention, respectively.

In this case, the embodiment of the present invention provides an feedback bundling improving program 220 in the program 112, for improving operation of ACK/NACK bundling when TDD UL/DL configuration is set to 0. Please refer to FIG. 4, which is a schematic diagram of a process 40 according to an embodiment of the present invention. The process 40 is utilized for improving ACK/NACK bundling in a UE of the wireless communication system 10, and can be compiled into the feedback bundling improving program 220. The process 40 includes the following steps:

Step 400: Start.

Step 402: Receive an uplink grant allocated to an uplink sub-frame, the uplink sub-frame being utilized for transmitting an HARQ feedback corresponding to a plurality of downlink sub-frames, a TDD UL/DL configuration of the UE being set to 0.

Step 404: Determine whether the UE misses any downlink assignment according to a DAI carried in a latest received PDCCH signaling for downlink assignment.

Step 406: End.

According to the process 40, the UE receives an uplink grant allocated to an uplink sub-frame when TDD UL/DL configuration is 0. The uplink sub-frame is utilized for transmitting an HARQ feedback corresponding to a plurality of downlink sub-frames. In other words, the uplink sub-frame is a common sub-frame of ACK/NACK bundling, and the plurality of downlink sub-frames are a set of bundled sub-frames. For TDD UL/DL configuration 0, since there is no DAI field in a PDCCH with DCI format 0, the UE according to the embodiment of the present invention determines whether any downlink assignment is missing according to the DAI carried in a latest received PDCCH signaling for downlink assignment.

In other words, for TDD UL/DL configuration 0, since the PDCCH for uplink grant received by the UE does not have a DAI (i.e. V_UL_DAI), the UE shall determine whether any downlink assignment is missing according to the DAI carried in the latest received PDCCH signaling for downlink assignment (i.e. V_DL_DAI). For example, if the parameter V_DL_DAI does not conform to the parameter U_DAI (i.e. $V_{DAI}^{DL} \neq (U_{DAI}-1) \bmod 4+1$, the UE determines at least one downlink assignment is missing, and shall transmit a NACK in the common sub-frame.

Similarly, the UE cannot determine a number of PDSCH transmissions within the bundled sub-frames according to the parameter V_UL_DAI. In this case, the embodiment of the present invention can only rely on a sum of the parameter U_DAI and the parameter N_SPS to determine whether the UE shall transmit ACK/NACK in the common sub-frame. If the sum of the parameter U_DAI and the parameter N_SPS is 0 (i.e. there is no PDSCH transmission within the bundled sub-frames), then the UE does not need to transmit ACK/NACK in the common sub-frame. As for definitions of the parameter V_UL_DAI, V_DL_DAI and the parameter U_DAI, please refer to the prior art section, which is not narrated herein.

As a result, the UE according to the embodiment of the present invention can correctly determine whether any downlink assignment is missing, so as to transmit ACK or NACK in the common sub-frame.

Figure 5:
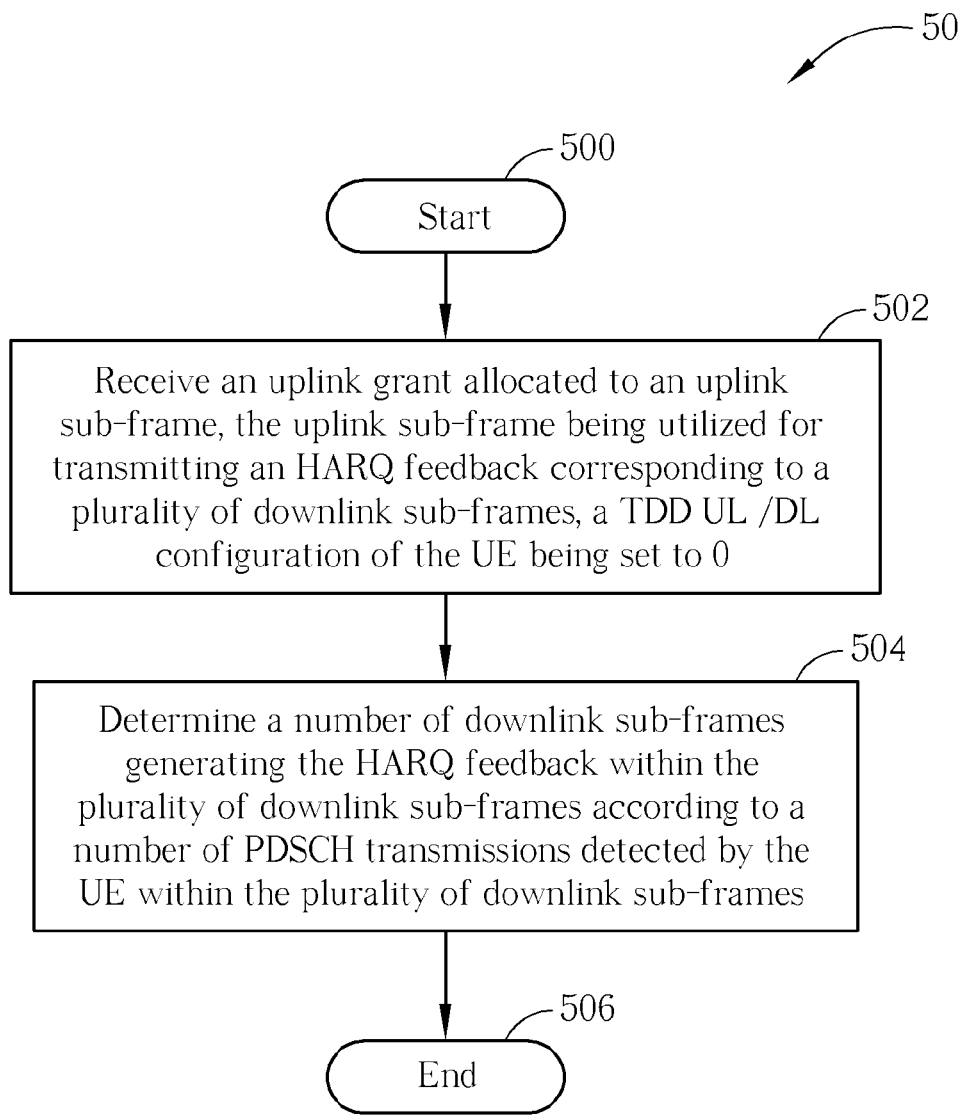

Please refer FIG. 5, which is a schematic diagram of a process 50 according to an embodiment of the present invention. The process 50 is utilized for improving ACK/NACK bundling in a UE of the wireless communication system 10, and can be compiled into the feedback bundling improving program 220 as well. The process 50 includes the following steps:

Step 500: Start.

Step 502: Receive an uplink grant allocated to an uplink sub-frame, the uplink sub-frame being utilized for transmitting an HARQ feedback corresponding to a plurality of downlink sub-frames, a TDD UL/DL configuration of the UE being set to 0.

Step 504: Determine a number of downlink sub-frames generating the HARQ feedback within the plurality of downlink sub-frames according to a number of PDSCH transmissions detected by the UE within the plurality of downlink sub-frames.

Step 506: End.

According to the process 50, the UE receives an uplink grant allocated to an uplink sub-frame when TDD UL/DL configuration is 0. The uplink sub-frame is utilized for transmitting an HARQ feedback corresponding to a plurality of downlink sub-frames. In other words, the uplink sub-frame is a common sub-frame of ACK/NACK bundling, and the plurality of downlink sub-frames are a set of corresponding bundled sub-frames. For TDD UL/DL configuration 0, since the PDCCH with DCI format 0 does not have a DAI field, the UE determines a number of downlink sub-frames generating the HARQ feedback within the bundled sub-frames according to a number of PDSCH transmissions detected by the UE within the bundled sub-frames.

The number of the PDSCH transmissions detected by the UE within the bundled sub-frames includes dynamic scheduled PDSCH transmissions (i.e. PDSCH transmissions with a corresponding PDCCH) and pre-defined PDSCH transmissions (i.e. PDSCH transmissions without a corresponding PDCCH), which are denoted by the parameter U_DAI and the parameter N_SPS, respectively.

In a word, for TDD UL/DL configuration 0, since the PDCCH for uplink grant received by the UE does not have a DAI (i.e. V_UL_DAI), the embodiment of the present invention can only rely on the number of PDSCH transmissions detected by the UE within the bundled sub-frames (i.e. U_DAI and N_SPS) to determine the number of downlink sub-frames that generate the HARQ feedback within the bundled sub-frames (i.e. N_bundled). For example, in the embodiment of the present invention, the UE can set the number of downlink sub-frames generating the HARQ feedback within the bundled sub-frames as a sum of the parameter U_DAI and the parameter N_SPS.

As a result, the UE according to the embodiment of the present invention can correctly determine the number of downlink sub-frames generating the HARQ feedback within the bundled sub-frames, so as to improve the operation of ACK/NACK bundling.

Figure 6:
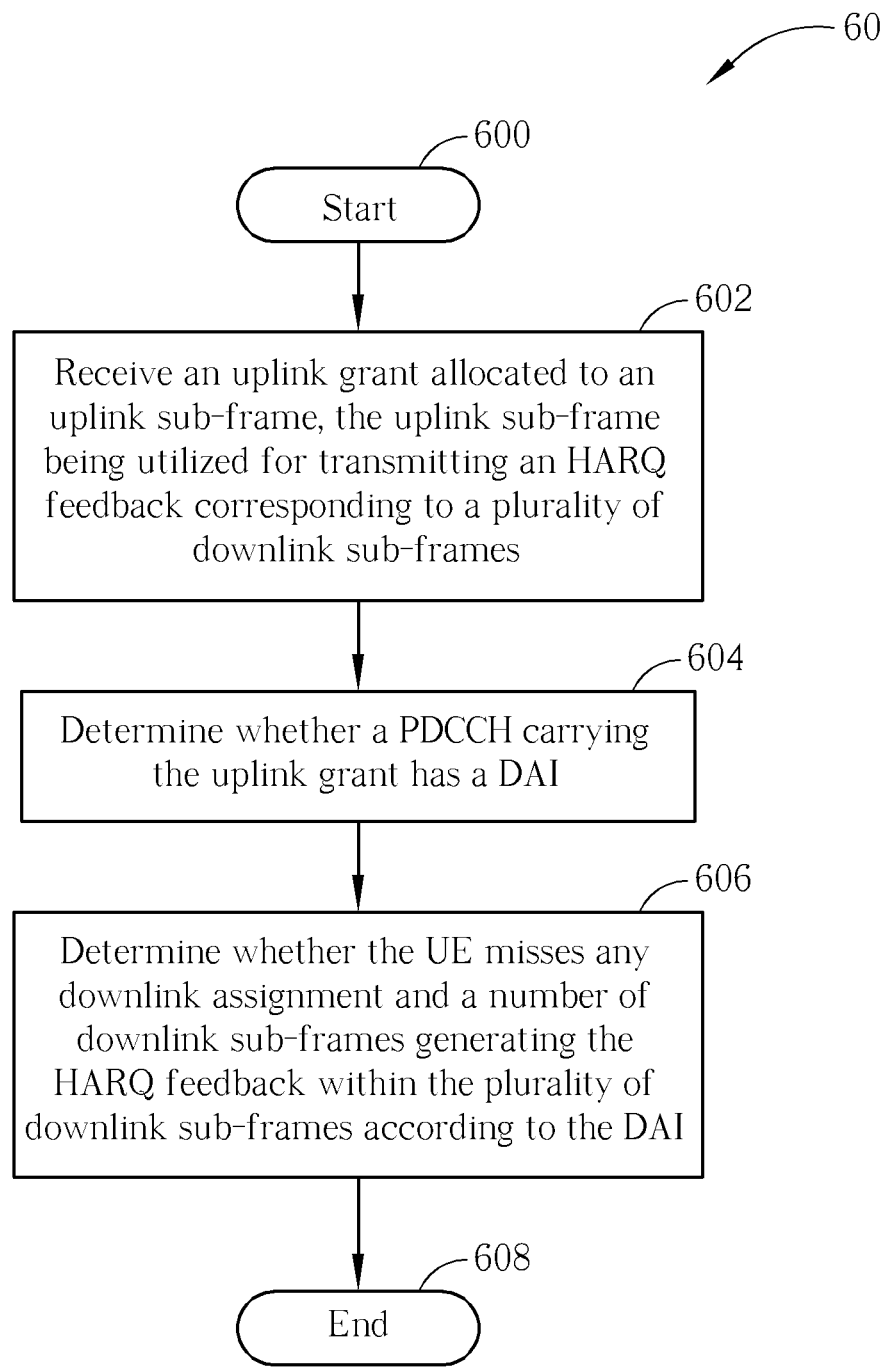

Please refer to FIG. 6, which is a schematic diagram of a process 60 according to another embodiment of the present invention. The process 60 is utilized for improving ACK/NACK bundling in a UE of the wireless communication system 10, and can be compiled into the feedback bundling improving program 220. The process 60 includes the following steps:

Step 600: Start.

Step 602: Receive an uplink grant allocated to an uplink sub-frame, the uplink sub-frame being utilized for transmitting an HARQ feedback corresponding to a plurality of downlink sub-frames.

Step 604: Determine whether a PDCCH carrying the uplink grant has a DAI.

Step 606: Determine whether the UE misses any downlink assignment and a number of downlink sub-frames generating the HARQ feedback within the plurality of downlink sub-frames according to the DAI.

Step 608: End.

According to the process 60, the UE first receives an uplink grant allocated to an uplink sub-frame. The uplink sub-frame is utilized for transmitting an HARQ feedback corresponding to a plurality of downlink sub-frames. In other words, the uplink sub-frame is a common sub-frame of ACK/NACK bundling, and the plurality of downlink sub-frames are a set of corresponding bundled sub-frames. Then, the embodiment of the present invention determines whether a PDCCH carrying the uplink grant includes a DAI. Finally, the embodiment of the present invention determines whether any downlink assignment is missing and a number of downlink sub-frames generating the HARQ feedback within the bundled sub-frames according to the DAI indicated by the uplink grant.

Preferably, in the embodiment of the present invention, the uplink grant is determined to have the DAI if the TDD UL/DL configuration of the UE is set to 1-6. Therefore, when the TDD UL/DL configuration of the UE is set to 1-6, the UE can determine whether any downlink assignment is missing and the number of downlink sub-frames generating the HARQ feedback within the bundled sub-frames according to the DAI indicated by the uplink grant (i.e. V_UL_DAI).

In other words, the UE utilizes the value of the parameter V_UL_DAI to determine whether any downlink assignment is missing and the number of downlink sub-frames generating the HARQ feedback within the bundled sub-frames (i.e. N_bundled) only when the TDD UL/DL configuration of the UE is set to 1-6. As a result, the embodiment of the present invention can prevent the UE from having false determination when the TDD UL/DL configuration of the UE is set to 0.

In summary, the embodiment of the present invention provides a method for improving ACK/NACK bundling in a UE of a wireless communication system, for allowing the UE to correctly determine whether any downlink assignment is missing, so as to transmit ACK or NACK in the common sub-frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving acknowledgement/negative-acknowledgement (ACK/NACK) bundling in a user equipment (UE) of a wireless communication system, the method comprising:
receiving an uplink (UL) grant allocated to an uplink sub-frame, the uplink sub-frame being utilized for transmitting a hybrid automatic repeat request (HARQ) feedback corresponding to a downlink (DL) sub-frame;
if a time division duplex (TDD) UL/DL configuration of the UE is set to 0, determining whether the UE misses any downlink assignment according to a downlink assignment index (DAI) carried in latest received Physical Downlink Control Channel (PDCCH) signaling for downlink assignment;
if a time division duplex (TDD) UL/DL configuration of the UE is set to 1-6, determining whether the UE misses any downlink assignment according to a DAI carried in a received PDCCH signaling for the uplink grant; and
transmitting the HARQ (Hybrid Automatic Repeat Request) feedback based on the determination whether the UE misses any downlink assignment.

2. The method of claim 1 further comprising: not transmitting the HARQ feedback in the uplink sub-frame if no Physical Downlink Shared Channel (PDSCH) transmission is performed within the downlink sub-frame.

3. The method of claim 1, wherein the uplink grant is carried in a PDCCH signaling with Downlink Control Information (DCI) format 0.

4. A communication device for improving acknowledgement/negative-acknowledgement (ACK/NACK) bundling in a user equipment (UE) of a wireless communication system, the communication device comprising:
a control circuit;
a processor installed in the control circuit;
a memory installed in the control circuit and coupled to the processor;
wherein the processor is configured to execute a program code stored in the memory for improving ACK/NACK bundling by:
receiving an uplink (UL) grant allocated to an uplink sub-frame, the uplink sub-frame being utilized for transmitting a hybrid automatic repeat request (HARQ) feedback corresponding to a downlink (DL) sub-frame;
if a time division duplex (TDD) UL/DL configuration of the UE is set to 0, determining whether the UE misses any downlink assignment according to a downlink assignment index (DAI) carried in a latest received Physical Downlink Control Channel (PDCCH) signaling for downlink assignment;
if a time division duplex (TDD) UL/DL configuration of the UE is set to 1-6, determining whether the UE misses any downlink assignment according to a DAI carried in a received PDCCH signaling for the uplink grant; and
transmitting the HARQ (Hybrid Automatic Repeat Request) feedback based on the determination whether the UE misses any downlink assignment.

5. The communication device of claim 4, wherein the processor is configured to execute a program code stored in the memory for improving ACK/NACK bundling by:
not transmitting the HARQ feedback in the uplink sub-frame if no Physical Downlink Shared Channel (PDSCH) transmission is performed within the downlink sub-frame.

6. The communication device of claim 4, wherein the uplink grant is carried in a PDCCH signaling with Downlink Control Information (DCI) format 0.

7. A method for improving acknowledgement/negative-acknowledgement (ACK/NACK) bundling in a user equipment (UE) of a wireless communication system, the method comprising:
receiving an uplink (UL) grant allocated to an uplink sub-frame, the uplink sub-frame being utilized for transmitting a hybrid automatic repeat request (HARQ) feedback corresponding to a downlink (DL) sub-frame;
if a time division duplex (TDD) UL/DL configuration of the UE is set to 0, determining the number of downlink sub-frames generating the HARQ feedback within the downlink sub-frames according to the number of PDSCH (Physical Downlink Shared Channel) transmissions detected by the UE within the downlink sub-frame;
if a time division duplex (TDD) UL/DL configuration of the UE is set to 1-6, determining the number of assigned subframes according to a downlink assignment index (DAI) carried in a received Physical Downlink Control Channel (PDCCH) signaling for the uplink grant; and
transmitting the HARQ (Hybrid Automatic Repeat Request) feedback based on the determination of the number of downlink sub-frames generating the HARQ feedback.

8. The method of claim 7, wherein the UE maintains a parameter U_DAI and a parameter N_SPS, the parameter U_DAI denoting number of PDSCH transmissions with a corresponding PDCCH within the downlink sub-frame, the parameter N_SPS denoting number of PDSCH transmissions without a corresponding PDCCH within the downlink sub-frame.

9. The method of claim 8, wherein determining the number of the downlink sub-frame generating the HARQ feedback within the downlink sub-frames comprises: setting the number of downlink sub-frame generating the HARQ feedback within the downlink sub-frame as a sum of the parameter U_DAI and the parameter N_SPS.

10. A communication device for improving acknowledgement/negative-acknowledgement (ACK/NACK) bundling in a user equipment (UE) of a wireless communication system, the communication device comprising:
a control circuit;
a processor installed in the control circuit;
a memory installed in the control circuit and coupled to the processor;
wherein the processor is configured to execute a program code stored in the memory for improving ACK/NACK bundling by:
receiving an uplink (UL) grant allocated to an uplink sub-frame, the uplink sub-frame being utilized for transmitting a hybrid automatic repeat request (HARQ) feedback corresponding to a downlink (DL) subframe;
if a time division duplex (TDD) UL/DL configuration of the UE is set to 0, determining the number of downlink sub-frame generating the HARQ feedback within the downlink sub frame according to the number of PDSCH (Physical Downlink Shared Channel) transmissions detected by the UE within the downlink sub-frame;
if a time division duplex (TDD) UL/DL configuration of the UE is set to 1-6, determining the number of assigned subframes according to a downlink assignment index (DAI) carried in a received Physical Downlink Control Channel (PDCCH) signaling for the uplink grant; and
transmitting the HARQ (Hybrid Automatic Repeat Request) based on the determination of the number of downlink sub-frame, generating the HARQ feedback.

11. The communication device of claim 10, wherein the UE maintains a parameter U_DAI and a parameter N_SPS, the parameter U_DAI denoting number of PDSCH transmissions with a corresponding PDCCH (Physical Downlink Control Channel) within the downlink sub-frame, the parameter N_SPS denoting number of PDSCH transmissions without a corresponding PDCCH within the downlink sub-frame.

12. The communication device of claim 11, wherein the step of determining the number of the downlink sub-frame generating the HARQ feedback of the downlink sub-frame in the program comprises:
setting the number of downlink sub-frame generating the HARQ feedback within the downlink sub-frame as a sum of the parameter U_DAI and the parameter N_SPS.

13. A method for improving acknowledgement/negative-acknowledgement (ACK/NACK) bundling in a user equipment (UE) of a wireless communication system, the method comprising:
receiving an uplink (UL) grant allocated to an uplink sub-frame, the uplink sub-frame being utilized for transmitting a hybrid automatic repeat request (HARQ) feedback corresponding to a downlink (DL) sub-frame;
determining whether a PDCCH (Physical Downlink Control Channel) carrying the uplink grant has a downlink assignment index (DAI);
if the uplink grant has a downlink assignment index (DAI), determining whether the UE misses any downlink assignment and the number of assigned subframes according to the DAI of PDCCH carrying the uplink grant;
if the uplink grant does not have a downlink assignment index (DAI), determining whether the UE misses any downlink assignment according to a downlink assignment index (DAI) carried in a latest received Physical Downlink Control Channel (PDCCH) signaling for downlink assignment and determining the number of assigned subframes according to the number of PDSCH (Physical Downlink Shared Channel) transmissions detected by the UE within the downlink sub-frame; and
transmitting the HARQ (Hybrid Automatic Repeat Request) feedback based on the determination whether the UE misses any downlink assignment.

14. The method of claim 13, wherein the step of determining whether the PDCCH carrying the uplink grant has the DAI comprises:
determining the PDCCH has the DAI only if a time division duplex (TDD) UL/DL configuration of the UE is set to 1-6.

15. A communication device for improving acknowledgement/negative-acknowledgement (ACK/NACK) bundling in a user equipment (UE) of a wireless communication system, the communication device comprising:
a control circuit;
a processor installed in the control circuit;
a memory installed in the control circuit and coupled to the processor;
wherein the processor is configured to execute a program code stored in the memory for improving ACK/NACK bundling by:
receiving an uplink (UL) grant allocated to an uplink sub-frame, the uplink sub-frame being utilized for transmitting a hybrid automatic repeat request (HARQ) feedback corresponding to a downlink (DL) sub-frame;
determining whether a PDCCH (Physical Downlink Control Channel) carrying the uplink grant has a downlink assignment index (DAI);
if the uplink grant has a downlink assignment index (DAI), determining whether the UE misses any downlink assignment and the number of assigned subframes according to the DAI of PDCCH carrying the uplink grant;
if the uplink grant does not have a downlink assignment index (DAI), determining whether the UE misses any downlink assignment according to a downlink assignment index (DAI) carried in a latest received Physical Downlink Control Channel (PDCCH) signaling for downlink assignment and determining the number of assigned subframes according to the number of PDSCH (Physical Downlink Shared Channel) transmissions detected by the UE within the downlink sub-frame; and
transmitting the HARQ (Hybrid Automatic Repeat Request) feedback based on the determination whether the UE misses any downlink assignment.

16. The communication device of claim 15, wherein the step of determining whether the PDCCH carrying the uplink grant has a V_UL_DAI parameter comprises:

determining the PDCCH has the V_UL_DAI parameter only if a time division duplex (TDD) UL/DL configuration of the UE is set to 1-6;

wherein the V_UL_DAI parameter defines a total number of downlink sub-frame with PDSCH transmissions within bundled sub-frames.

\* \* \* \* \*